(12) United States Patent
Seki et al.

(10) Patent No.: US 7,011,900 B2
(45) Date of Patent: Mar. 14, 2006

(54) MAGNETIC RECORDING MEDIUM (75) Inventors: Akihiko Seki, Tokyo (JP); Takayoshi Kuwajima, Tokyo (JP); Naoto Yajima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/806,096

(22) Filed: Mar. 23, 2004

(65) Prior Publication Data

US 2004/0197605 A1    Oct. 7, 2004

(30) Foreign Application Priority Data

Mar. 31, 2003 (JP) .............................. 2003-096894

(51) Int. Cl.
*G11B 5/735* (2006.01)
(52) U.S. Cl. .................. 428/845.5; 428/844.3
(58) Field of Classification Search .......... 428/141, 428/336, 694 BN, 694 BR, 694 BB, 845.5, 428/844.3
See application file for complete search history.

(56) References Cited

U.S. PATENT DOCUMENTS

| 5,443,913 A | * | 8/1995 | Kohno et al. ............ 428/425.9 |
| 5,712,028 A | | 1/1998 | Seki et al. |
| 6,127,039 A | | 10/2000 | Saitoh et al. |

FOREIGN PATENT DOCUMENTS

| JP | 1-176319 | 7/1989 |
| JP | 5-63842 | 9/1993 |
| JP | 10-11736 | 1/1998 |
| JP | 2003-323710 | 11/2003 |
| JP | 2004-63010 | 2/2004 |

* cited by examiner

*Primary Examiner*—Stevan A. Resan
(74) *Attorney, Agent, or Firm*—Oblon, Spivak, McClelland, Maier & Neustadt, P.C.

(57) ABSTRACT

A magnetic recording medium is prepared by coating a dispersion of non-magnetic powder and ferromagnetic powder in a binder and a dispersion of ferromagnetic powder in a binder to a non-magnetic substrate by a wet-on-wet coating technique to form subordinate and magnetic layers on the substrate, and subjecting the layers to magnetic field orientation. The subordinate layer has a Br of 80 to 400 gauss, and the magnetic layer has a thickness of 0.1 to 0.4 μm. The medium has surface smoothness and good electromagnetic characteristics and lends itself to recording and reproducing signals having a minimum wavelength of 0.2 to 0.7 μm.

7 Claims, 1 Drawing Sheet

MAGNETIC RECORDING MEDIUM

BACKGROUND OF THE INVENTION

1. Field of the Invention

The present invention relates to magnetic recording medium, and more particularly, to magnetic recording medium having excellent electromagnetic conversion characteristics and excellent running durability.

2. Disclosure of the Related Art

A typical magnetic recording medium comprises of a magnetic layer on one side of a non-magnetic support and a back coat layer on the other side of the support. In helical recording, which has been the major recording scheme in conventional magnetic recording systems, the running speed of the tape itself is not so fast in spite of the relatively high running speed of the tape relative to the recording head. Thus, the running or recording performance of the tape is not significantly affected in helical recording if the back coat layer has a proper strength.

In order to control the coating strength of a back coat layer, inorganic powder such as a-alumina (i.e., an abrasive) is added to the back coat layer. For example, Japanese Patent Publication No. Hei 5-63842 (1993) discloses a back coat layer comprising an electron beam-curable resin binder composition that contains at least one of an electro-conductive filler powder and an inorganic filler powder. The amounts of the electro-conductive filler and the inorganic filler are in the respective ranges of from 20 to 100 parts by weight and from 25 to 300 parts by weight with respect to 100 parts by weight of the binder.

Japanese Patent Laid-Open Publication No. Hei 1-176319 (1989) discloses a back coat layer containing carbon black and an $Al_2O_3$ powder that has an a phase ratio of 40 to 70 wt % and has an average particle size of 0.3 to 0.6 $\mu$m.

Japanese Patent Laid-Open Publication No. Hei 10-11736 (1998) discloses a magnetic tape for recording computer data. The magnetic tape comprises of a 0.5 to 2.0 $\mu$m thick non-magnetic lower layer and a 0.05 to 0.5 $\mu$m thick upper layer, each disposed on one side of a non-magnetic support, and a back coat layer disposed on the other side of the support. The tape has a Young's modulus of 1200 kg/mm² or more along the longitudinal direction of the tape. The back coat layer contains a soft inorganic powder that has an average particle size of 30 to 50 nm and has a Mohs hardness of 3 to 4.5, along with a hard inorganic powder that has an average particle size of 80 to 250 nm and has a Mohs hardness of 5 to 9. The total thickness of the magnetic tape is 7 $\mu$m or less.

As opposed to helical recording, current linear recording tapes for use with computers are run at a high tape speed of, for example, 2.5 m/s or higher and are therefore subjected to many problems during repeated runs. Such problems include the back coat layer being abraded by the guide roll, the resulting debris being taken up by the tape and transferred to the magnetic layer, and the magnetic layer being scratched and abraded during the high-speed sliding of the back coat layer against the magnetic layer. These problems cause an increase in the error rate and head-to-tape sticking and, thus, clogged head.

To solve these problems, magnetic recording medium comprising a back coat layer with even improved strength needs to be developed.

SUMMARY OF THE INVENTION

Accordingly, an object of the present invention is to solve the above-described problems and provide a magnetic recording medium, in particular a linear recording tape for use with computers, comprising a back coat layer with proper strength and having excellent electromagnetic conversion characteristics and excellent running durability.

The present inventors have discovered that the scratches and abrasions inflicted on the magnetic layer during the high-speed sliding of the back coat layer against the magnetic layer can be prevented by reinforcing the back coat layer and adjusting the ratio of the strength of the back coat layer to that of the magnetic layer to a proper range. The discovery has inspired the present inventors to devise the present invention.

In one aspect, the present invention provides a magnetic recording medium, comprising a lower non-magnetic layer on one surface of the non-magnetic support, an upper magnetic layer on the lower non-magnetic layer, and a back coat layer on the other surface of the non-magnetic support. This magnetic recording medium is characterized in that the magnetic layer has a SENDUST abrasion volume $S_{MC}$ of $3.0 \times 10^4$ $(\mu m)^3/m$ or less and a ratio $(S_{BC}/S_{MC})$ of a SENDUST abrasion volume $S_{BC}$ by the back coat layer to the SENDUST abrasion volume $S_{MC}$ by the magnetic layer is in the range of 0.5 to 3.0.

Preferably, the SENDUST abrasion volume $S_{BC}$ by the back coat layer is in the range of $0.4 \times 10^4$ $(\mu m)^3/m$ or more and $4.0 \times 10^4$ $(\mu m)^3/m$ or less.

Preferably, a surface roughness Ra of the back coat layer is 20 nm or less.

Preferably, an AFM surface roughness Ra of the magnetic layer is in the range of 3.0 to 8.0 nm.

Preferably, the magnetic layer has a thickness of 0.3 $\mu$m or less.

Preferably, the lower non-magnetic layer is disposed on one surface of the non-magnetic support, and a magnetic layer is disposed on the lower non-magnetic layer.

According to the present invention, there is provided a magnetic recording medium, in particular, a linear recording tape for use with computers, that has excellent electromagnetic conversion characteristics and excellent running durability.

BRIEF DESCRIPTION OF THE DRAWINGS

FIGS. 1(*a*) and 1(*b*) are diagrams illustrating the manner by which the SENDUST abrasion volume by the back coat layer or by the magnetic layer can be measured in accordance with the present invention.

DETAILED DESCRIPTION OF THE INVENTION

Specific features of the present invention will now be described in detail.

A magnetic recording-medium in accordance with the present invention (also referred to as 'magnetic tape' or 'tape,' hereinafter) comprises a lower non-magnetic layer on one surface of the non-magnetic support, an upper magnetic layer preferably 0.3 $\mu$m or less in thickness and disposed on the lower non-magnetic layer, and a back coat layer on the other surface of the non-magnetic support. In the present invention, a lubricant coating and various protective coatings for protecting the magnetic layer may be applied over the magnetic layer if necessary. To improve adhesion of the applied coating and the non-magnetic support and for other purposes, a undercoat layer (adhesive layer) may be disposed on the surface of the non-magnetic support on which the magnetic layer is to be deposited.

A key factor in the present invention is the relationship between the coating strength of the back coat layer and the coating strength of the magnetic layer. The coating strength of each layer is determined by running a magnetic tape on a SENDUST material under predetermined conditions and measuring the volume of abraded material (the abraded volume reflects the ability of the tape to abrade). Specifically, the larger the abraded volume of the SENDUST material, the higher the coating strength. The SENDUST abrasion volume by the back coat layer or the magnetic layer is determined under the following conditions.

Figure 1:
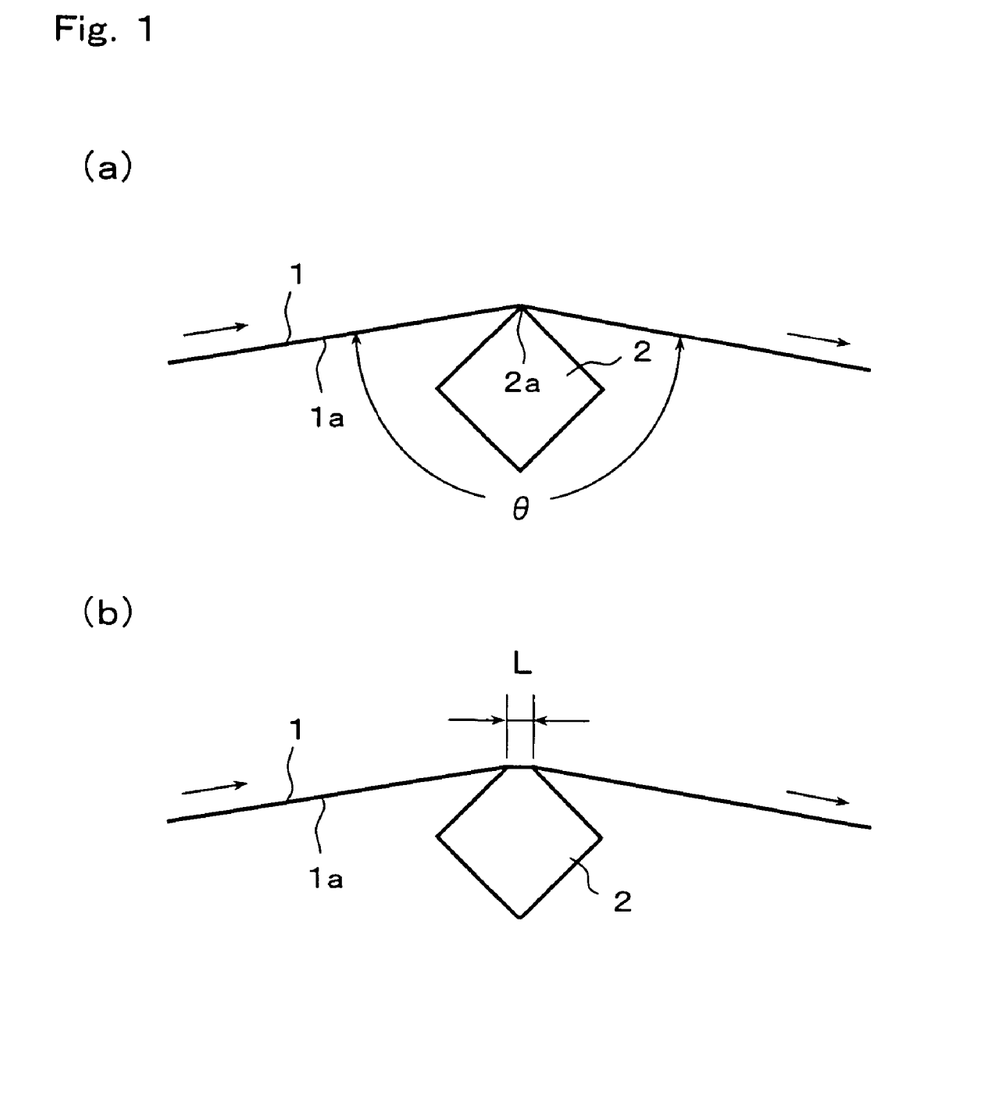

As shown in FIG. 1(a), a tape 1 is passed on a square prismatic SENDUST material in such a manner that a surface 1a of the tape 1 to be measured (a surface having either a back coat layer or a magnetic layer) is kept in contact with a ridge 2a of the SENDUST material 2 to abrade the article 2 (FIG. 1(b)).
1. Tape width: 12.650 mm
2. Tape running speed: 2.54 m/sec
3. A 300 m length of the tape was passed on the article 600 times (300 times of back-and-forth movements).
4. SENDUST material: SD-5, a square prismatic article with right-angle corners(square cross-section).
5. Tension exerted on the tape during runs of the tape against SENDUST material: 1.4N/tape width.
6. The angle $\theta$ that the tape wrapped around the SENDUST material makes: $\theta=164°$.
7. After the running of the tape, the length L($\mu$m) of the flat surface formed on the SENDUST material as a result of abrasion with the tape was measured along the direction of the tape movement. Measurements were taken at three different points and the average (Lm) was taken. The abraded volume for each meter of the tape was determined by the following equation:

Abraded volume [($\mu$m)$^3$/m]=[(½)×Lm×(Lm/2)× 12.650×10$^3$]/300

The magnetic recording medium of the present invention has an abrasion volume ratio ($S_{BC}/S_{MC}$) of the SENDUST abrasion volume $S_{BC}$ by the back coat layer to the SENDUST abrasion volume $S_{MC}$ by the magnetic layer of 0.5 to 3.0, preferably 0.5 to 2.0. The magnetic recording medium having the $S_{BC}/S_{MC}$ ratio within the specified range is less susceptible to scratches and abrasions on the magnetic layer during runs on a drive even upon the high-speed sliding of the back coat layer against the magnetic layer. Should the $S_{BC}/S_{MC}$ ratio exceed 3.0, then the coating strength of the back coat layer will become too high relative to the coating strength of the magnetic layer, making the magnetic layer susceptible to scratches inflicted by the back coat layer during runs on a drive. On the other hand, if the $S_{BC}/S_{MC}$ ratio is smaller than 0.5, then the coating strength of the magnetic layer will become too high relative to the coating strength of the back coat layer, making the back coat layer susceptible to scratches inflicted by the magnetic layer during runs on a drive.

The absolute amount of the SENDUST abrasion volume for the magnetic layer must fall within a range determined by the standard values for each recording system on which the recording medium is to be run. In many recording systems, a standard on the head abrasion per unit amount of time is given for the recording layer-side (the magnetic layer-side) of the tape: it is preferred that the magnetic layer for use in a current recording system has a SENDUST abrasion volume $S_{MC}$ of 3.0×10$^4$($\mu$m)$^3$/m or less in terms of the head life. If the value of $S_{MC}$ exceeds 3.0×10$^4$($\mu$M)$^3$/m, then the head life will be adversely affected. It is thus important to adjust the SENDUST abrasion volume $S_{BC}$ of the back coat layer so that the value of $S_{BC}/S_{MC}$ remains within the range of 0.5 to 3.0 with respect to the standardized magnetic layer while maximizing the coating strength of the back coat layer.

In the present invention, the SENDUST abrasion volume $S_{BC}$ of the back coat layer is preferably in the range of 0.4×10$^4$ to 4.0×10$^4$($\mu$M)$^3$/m. If the value of $S_{BC}$ is less than 0.4×10$^4$($\mu$m)$^3$/m, then the back coat layer will become weak and may become susceptible to abrasions inflicted by a guide roll during runs on a drive. In contrast, if the value of $S_{BC}$ exceeds 4.0×10$^4$($\mu$m)$^3$/m, then the magnetic layer may become susceptible to scratches.

For each of the magnetic layer and the back coat layer, a hard inorganic powder (Mohs hardness of approximately 5 to 9) may be added to the layer or a resin such as nitrocellulose may be used in order to increase the coating strength. Conversely, when it is desired to decrease the coating strength, a soft inorganic powder (Mohs hardness of 3 to 4.5) may be added to the layer, or a resin, such as vinyl chloride/polyurethane type resin, that undergoes significant deformation upon calendering may be used. In the present invention, the coating strength of the magnetic layer and the back coat layer can be adjusted to some extent by adding a proper inorganic powder, by using a proper resin, or by adding a proper organic additive to thereby adjust the SENDUST abrasion volumes (i.e., $S_{MC}$ and $S_{BC}$).

One important factor that largely contributes to the coating strength as measured in the SENDUST abrasion volumes is the surface roughness. Specifically, the smaller the surface roughness of a coating is, the smaller the abraded volume of the SENDUST material and, thus, the less the head abrasion will be. In general, the abrasion volume by the magnetic layer tends to be small even if the magnetic layer contains a hard inorganic powder since the surface roughness of the magnetic layer is selected to be much smaller than that of the back coat layer to compensate for the spacing loss during recording. The surface roughness of the back coat layer also needs to be properly selected since the surface roughness of the back coat layer, if too large, may be transferred to the magnetic layer-side depending on the conditions of winding or during thermo-setting and may lead to an increase in the error rate.

A current trend is toward development of smoother magnetic layer surfaces required in high-density recording that meet the head abrasion standards for magnetic layers for the current recording systems. For this reason, the abradability of the magnetic layer surface is on the decrease. Under such situations, the surface roughness of the back coat layer is preferably 20 nm or less, and more preferably in the range of 4 to 15 nm as measured in Ra value (Ra value is a measure of surface roughness determined as centerline average roughness (JIS-B-0601)). The surface roughness of the back coat layer Ra, if larger than 20 nm, may be transferred to the surface of the magnetic layer.

When the same composition is used to make the back coat layer and it is desired to decrease the surface roughness of the back coat layer, the level of dispersion may be increased or the temperature/pressure during calendering may be increased. Conversely, when it is desired to increase the surface roughness of the back coat layer, temperature/pressure during calendering may be decreased or the calendering process may be omitted. Since the surface roughness is substantially inversely proportional to the coefficient of kinetic friction, an increase in the friction cannot be prevented by the addition of a friction-reducing organic additive if the surface roughness Ra is too small. As a result, the running of the tape becomes unstable and the friction between the tape and a guide roller and other components that the tape slides against may lead to an excess load applied to the coating, thereby damaging the coating. In addition, to ensure stable running of the tape, the coefficient of kinetic friction between the magnetic layer and the back coat layer must be well-balanced; too low a coefficient of kinetic friction of the back coat layer is unfavorable. The coefficient of kinetic friction of the back coat layer is preferably in the range of 0.10 to 0.40, and more preferably in the range of 0.10 to 0.30.

The centerline average roughness (Ra) of the surface of the magnetic layer is typically in the range of 1.0 to 8.0 nm, and preferably in the range of 2.0 to 7.0 nm. If the Ra value is less than 1.0 nm, then the surface of the magnetic layer will become excessively smooth and the running stability will be decreased, often leading to troubles during the running of the tape. On the other hand, if the Ra value is larger than 8.0 nm, then the surface of the magnetic layer will become excessively rough, resulting in a decrease in the reproduction output and other electromagnetic conversion characteristics in the reproduction systems that use MR heads.

As increasingly shorter recording wavelengths are being used in current high-density recording systems, it is desirable to take into consideration the surface roughness of microscopic areas (for example, approximately 10 $\mu$m×10 $\mu$m area) in order to accurately evaluate the output, the error rate and other characteristics of the magnetic layer. From the viewpoint of the surface roughness determined solely from the microscopic areas, the magnetic layer preferably has a surface roughness in the range of 3.0 to 8.0 nm, more preferably in the range of 3.0 to 6.0 nm, as measured in the AFM surface roughness Ra value. The AFM Ra value is determined based on Ra defined by JIS-B-0601, which is determined from the surface roughness curve obtained based on the observation with an atomic force microscope. If the AFM Ra value is less than 3.0 nm, then the surface will become excessively smooth and the running stability may be decreased, often resulting in troubles during the running of the tape. On the other hand, if the AFM Ra value exceeds 8.0 nm, the error rate may be increased.

The magnetic recording medium of the present invention may now be described with regard to each layer.

[Back Coat Layer]

The back coat layer serves both to ensure the running stability of the magnetic recording medium and to prevent the magnetic layer from being electrified. This layer contains carbon black, a non-magnetic inorganic powder other than carbon black, and a binder resin.

The back-coat layer preferably contains 30 to 80 wt % carbon black with respect to the amount of the back coat layer. If the amount of carbon black is too small, then the electrification preventing effect of the back coat layer may be reduced, as may the running stability. In addition, the light transmittance of the magnetic medium may be increased, which may pose problems in systems in which tape ends are detected by the changes in the light transmittance. On the other hand, if the amount of carbon black is excessively large, then the strength of the back coat layer will be reduced, resulting in a decrease in the running durability. Carbon black may be of any type that is commonly in use and preferably has a particle size in the range of about 5 to 500 nm . The particle size of carbon black is generally measured by a transmission electron microscope.

It is preferred that the carbon black contain minimal amounts of water-soluble sodium ions and water-soluble calcium ions: the amount of the water-soluble sodium ions is preferably 500 ppm or less, more preferably 300 ppm or less while the amount of the water-soluble calcium ions is preferably 300 ppm or less, more preferably 200 ppm or less. When contained in amounts greater than the specified range, the water-soluble sodium ions or the water-soluble calcium ions may form salts with organic acids (in particular, fatty acids, which will be described later) present in the coating. Such salts may seep out to the surface of the coating, causing drop-outs or an increase in the error rate.

To minimize the amounts of the water-soluble sodium ions and the water-soluble calcium ions in the carbon black, the purity of water used to terminate the reaction during the production of the carbon black or the purity of water used in the granulation process may be increased. Production processes of carbon black are described in Japanese Patent Laid-Open Publication No. Hei 11-181323(1999), Japanese Patent Laid-Open Publication No. Hei 10-46047(1998), and Japanese Patent Laid-Open Publication No. Hei 8-12898 (1996).

Aside from carbon black, the back coat layer may further contain various non-magnetic inorganic powders to control the mechanical strength of the magnetic recording medium. Examples of such inorganic powders include a-$Fe_2O_3$ (Mohs hardness=6 to 6.5), $CaCO_3$ (Mohs hardness=3), titanium oxide (Mohs hardness=6.5), barium sulfate (Mohs hardness=3.5), and a-$Al_2O_3$ (Mohs hardness=9). The amount of the non-magnetic inorganic powder is preferably in the range of 0.1 to 20 parts by weight, and more preferably in the range of 0.5 to 15 parts by weight, with respect to 100 parts by weight of carbon black. The non-magnetic inorganic powder preferably has an average particle size of 0.01 to 0.5 $\mu$m. Too small an amount of the non-magnetic inorganic powder may lead to insufficient mechanical strength of the back coat layer, whereas too large an amount of the powder may result in substantial abrasion of guide members that slide against the tape or may cause scratches on the magnetic layer.

Aside from the above-described materials, the back coat layer may contain binders such as thermoplastic resins, thermosetting or thermoreactive resins, and radiation-curable (electron beam- or UV-curable) resins. These binder resins are used in proper combinations depending on the characteristics of the magnetic recording medium and the conditions for the process.

A preferred thermoplastic resin is one that has a softening temperature of 1500° C. or below, an average molecular weight of 5000 to 200000, and a degree of polymerization of approximately 50 to 2000. A preferred thermosetting resin, thermoreactive resin, or a radiation-curable resin is one that has an average molecular weight of 5000 to 200000 and a degree of polymerization of approximately 50 to 2000 and can increase its molecular weight by undergoing condensation, addition, or other reaction processes when heated and/or irradiated with radiation (electron beam or UV) after being coated, dried, and calendered.

Of these binder resins, particularly preferred are combinations of nitrocellulose and polyurethane resins and combinations of vinyl chloride type copolymers and polyurethane resins.

A preferred vinyl chloride type copolymer is one with the vinyl chloride content of 60 to 95 wt %, in particular 60 to 90 wt %, and with the average degree of polymerization of approximately 100 to 500.

Examples of such vinyl chloride type resins include vinyl chloride-vinyl acetate-vinyl alcohol copolymers, vinyl chloride-hydroxyalkyl(meth)acrylate copolymers, vinyl chloride-vinyl acetate-maleic acid copolymers, vinyl chloride-vinyl acetate-vinyl alcohol-maleic acid copolymers, vinyl chloride-vinyl acetate-hydroxyalkyl(meth)acrylate copolymers, vinyl chloride-vinyl acetate-hydroxyalkyl(meth)acrylate-maleic acid copolymers, vinyl chloride-vinyl acetate-vinyl alcohol-glycidyl(meth)acrylate copolymers, vinyl chloride-hydroxyalkyl(meth)acrylate-glycidyl(meth)acrylate coplymers, vinyl chloride-vinyl acetate-vinyl alcohol-glycidyl(meth)acrylate copolymers, and vinyl chloride-hydroxyalkyl(meth)acrylate copolymers. Of these, copolymers of vinyl chloride and monomers having an epoxy (glycidyl) group are particularly preferred.

A preferred vinyl chloride type copolymer is one that contains sulfate group ($-OSO_3Y$) and/or sulfo group ($-SO_3Y$), which are each a polar group and are referred to as S-containing polar group, hereinafter, to increase the dispersibility. While Y in the S-containing polar groups may be any of H and alkali metals, particularly preferred S-containing polar groups are those in which Y is potassium, namely, $-OSO_3K$ and $-SO_3K$. The vinyl chloride type copolymer may contain either one of the two S-containing polar groups or it may contain both of them, in which case the two polar groups may be contained at any proportions.

"Polyurethane resin" for use with the vinyl chloride type resin is a general term, that encompasses all resins obtained through reactions between a hydroxyl-containing resin, such as a polyester polyol and/or a polyether polyol, and a polyisocyanate-containing compound. Such resins have an average molecular weight of approximately 5000 to 200000 and a Q-value (defined as weight average molecular weight/number average molecular weight) of approximately 1.5 to 4.

A preferred polyurethane resin may include a polar group on ends or side chains thereof. Polyurethane resins having a polar group with sulfur and/or phosphorus are particularly preferred.

Examples of the polar groups contained in the polyurethane resin are S-containing groups, such as $-SO_3M$, $-OSO_3M$, and $-SR$, P-containing polar groups, such as $-PO_3M$, $-PO_2M$, $-POM$, $-P=O(OM_1)(OM_2)$, and $-OP=O(OM_1)(OM_2)$, $-COOM$, $-OH$, $-NR_2$, $-N^+R_3X^-$ (where M, $M_1$, and $M_2$ are each independently H, Li, Na, or K; R is H or a hydrocarbon; and X is halogen atom), epoxy group, and $-CN$. Preferably, the polyurethane resin used includes at least one of these polar groups, which is introduced into the resin molecules through copolymerization or addition reaction. The polar group is preferably contained in the resin molecule in an amount of 0.01 to 3 wt % and may present either in the main chain of the resin molecules or in their branches.

Preferably, the polyurethane resin has a glass transition temperature Tg in the range of −20° C. to 80° C.

Using known techniques, such polyurethane resins can be obtained by reacting, in the presence or in the absence of a solvent, a material that contains a compound having a particular polar group and/or a resin material reacted with a compound having a particular polar group.

Preferably, the polyurethane resin is used in the back coat layer in an amount of 10 to 90 wt % with respect to the amount of the entire binder. The addition of the polyurethane resin is advantageous in that it ensures the ease of calendering, the running stability under high temperature environment, the balanced electromagnetic conversion characteristic and, in particular, the abrasion resistance and adhesion to the support. Preferably, the vinyl chloride type copolymer and the polar group-containing polyurethane resin having sulfur and/or phosphorus are mixed at a ratio (by weight) of the vinyl chloride type copolymer to the polyurethane resin of 10:90 to 90:10.

Aside from the vinyl chloride type copolymer and the polyurethane resin, various known resins may be added to the back coat layer in an amount of 20 wt % or less with respect to the amount of the entire binder.

Examples of the thermoplastic resins other than the vinyl chloride type copolymers and the polyurethane resins include (meth)acrylic resins, polyester resins, acrylonitrile-butadiene type copolymers, polyamide resins, polyvinylbutyral, nitrocellulose, styrene-butadiene type copolymers, polyvinyl alcohol resins, acetal resins, epoxy type resins, phenoxy type resins, polyether resins, polyfunctional polyethers such as polycaprolactones, polyamide resins, polyimide resins, phenol resins, polybutadiene elastomers, chlorinated rubbers, acrylic rubbers, isoprene rubbers, and epoxy-modified rubbers.

Examples of the thermosetting resins include phenol resins, epoxy resins, polyurethane resins, urea resins, butyral resins, formal resins, melamine-resins, alkyd resins, silicone resins, acrylic reactive resins, polyamide resins, epoxy-polyamide resins, saturated polyester resins, and urea formaldehyde resins.

Preferably, a crosslinking agent is used to harden the binder resin. While various polyisocyanates, especially diisocyanates, are suitably used as the crosslinking agent, at least one selected from tolylene diisocyanate, hexamethylene diisocyanate, and methylene diisocyanate is particularly preferred. It is particularly preferred that these crosslinkers are modified with a compound having a plurality of hydroxyl groups, such as trimethylolpropane, or that they are provided in the form of an isocyanulate-type crosslinker in which three molecules of a diisocyanate compound have been bound. In this manner, the crosslinkers can bind to functional groups present in the binder resins to thereby crosslink the resin. Preferably, the crosslinking agent is used in an amount of 10 to 30 parts by weight with respect to 100 parts by weight of the binder resin. In general, such thermosetting resins can be cured by heating them in an oven at 50 to 70° C. for 12 to 48 hours.

Also, the above-described binder resins may be modified to be electron-beam sensitive by introducing (meth)acrylic double bonds using known techniques. Several techniques for carrying out this modification are known: urethane modification, in which an adduct of tolylene diisocyanate (TDI) and 2-hydroxyethyl(meth)acrylate (2-HEMA) is reacted with the resin; modified urethane modification, in which a monomer (such as 2-isocyanate ethyl(meth)acrylate) that includes one or more ethylenic unsaturated double bonds and one isocyanate group within one molecule but not a urethane bond is used; and ester modification, in which a compound having a (meth)acryl group and an carboxylic anhydride or a dicarboxylic acid is reacted with a resin having a hydroxyl group or a carboxylic acid group. Of these techniques, modified urethane modification is preferred since, according to this technique, the resin does not become brittle even when a high proportion of vinyl chloride type resin is used and the technique provides coatings with high dispersibility and good surface properties.

When such an electron beam-curable binder resin is used, a known polyfunctional acrylate may be added in an amount of 1 to 50 parts by weight, preferably 5 to 40 parts by weight, with respect to 100 parts by weight of the binder resin, so as to enhance the crosslinking of the resin.

The amount of the binder resin for use in the back coat layer is preferably in the range of 15 to 200 parts by weight, and more preferably in the range of 50 to 180 parts by weight, with respect to 100 parts by weight of carbon black and the non-magnetic inorganic powder combined. If the amount of the binder resin is too large, then the friction between the tape and the guide rollers and other components that the tape slides against will become excessive, resulting in decreased running stability and making the tape prone to running failures. Too large an amount of the binder resin can also cause problems such as the back coat layer's blocking to the magnetic layer. Conversely, if the amount of the binder resin is too small, then the strength of the back coat layer will be decreased, often resulting in reduced running durability.

When necessary, a dispersing agent such as a surfactant, a lubricant such as a higher fatty acid, a fatty acid ester, and a silicone oil, and various other additives may be added to the back coat layer.

The lubricant may be any of known lubricants, including saturated or unsaturated fatty acids, fatty acid esters, and sugars, which may be used either individually or as a mixture of two or more. A preferred lubricant may comprise a mixture of two or more fatty acids with different melting points or a mixture of two or more fatty acid esters with different melting points. Such a lubricant is advantageous in that it can be adapted to any temperature condition under which the magnetic recording medium is used. The lubricant is continuously delivered to the surface of the medium.

Specific examples of the fatty acids include straight-chained saturated fatty acids, such as stearic acid, palmitic acid, myristic acid, lauric acid, and erucic acid; branched saturated fatty acids, such as isocetyl acid, and isostearic acid; and unsaturated fatty acids, such as oleic acid, linoleic acid, and linolenic acid.

Examples of the fatty acid esters include straight-chained saturated fatty acid esters, such as butyl stearate, and butyl palmitate; branched saturated fatty acid esters, such as isocetyl stearate, and isostearyl stearate; unsaturated fatty acid esters, such as isostearyl oleate; fatty acid esters of unsaturated alcohols, such as oleyl stearate; esters formed of unsaturated fatty acids and unsaturated alcohols, such as oleyl oleate; esters of diols, such as ethyleneglycol distearate; esters formed of diols and unsaturated fatty acids, such as ethyleneglycol monooleate, ethyleneglycol dioleate, and neopentylglycol dioleate; and esters formed of sugars and saturated or unsaturated fatty acids, such as sorbitan monostearate, sorbitan tristearate, sorbitan monooleate, and sorbitan trioleate.

While the amount of the lubricant in the back coat layer may be adjusted depending on its purpose, the lubricant is preferably contained in an amount of 1 to 20 wt % with respect to the total weight of carbon black and the inorganic powders other than carbon black.

The coating for depositing the back coat layer is prepared by adding an organic solvent to the above-described components. Such an organic solvent may be any organic solvent and is typically one or a combination of two or more solvents selected from various solvents, including ketone type solvents, such as methyl ethyl ketone, methyl isobutyl ketone, and cyclohexanone; and aromatic type solvents, such as toluene. The organic solvent is preferably used in an amount of 100 to 900 parts by weight with respect to 100 parts by weight of the carbon black, the various inorganic powders, and the binder resin combined.

After calendering, the back coat layer typically has a thickness of 1.0 $\mu$m or less, preferably from 0.1 to 1.0 $\mu$m, and more preferably from 0.2 to 0.8 $\mu$m. If the back coat layer is too thick, then the friction between the back coat layer and a guide roller and other components that the tape slides against becomes excessive, resulting in a decreased running stability. On the other hand, the back coat layer, when too thin, becomes susceptible to abrasion during the running of the magnetic recording medium. Also, when the back coat layer is too thin, the surface smoothness of the back coat layer is reduced due to the surface roughness of the non-magnetic support. As a result, when the back coat layer is hardened by heat, the surface roughness of the back coat layer tends to be transferred to the surface of the magnetic layer to cause a reduction in each of the power output at higher range, S/N, and C/N.

[Lower Non-Magnetic Layer]

The lower non-Magnetic layer contains carbon black, non-magnetic inorganic powders other than carbon black, and a binder resin.

Carbon black for use in the non-magnetic layer may be furnace black for rubbers, thermal black for rubbers, black for color, and acetylene black. Preferably, the carbon black has a specific surface area of 5 to 600 m$^2$/g, a DBP oil absorbance of 30 to 400 ml/100 g, and a particle size of 10 to 100 nm. Suitable carbon blacks are listed in "carbon black guide book" (ed., Carbon Black Association).

It is preferred that the carbon black contain minimal amounts of water-soluble sodium ions and water-soluble calcium ions: the amount of the water-soluble sodium ions is preferably 500 ppm or less, more preferably 300 ppm or less while the amount of the water-soluble calcium ions is preferably 300 ppm or less, more preferably 200 ppm or less. When contained in amounts greater than the specified range, the water-soluble sodium ions or the water-soluble calcium ions may form salts with organic acids (in particular, fatty acids) present in the coating. Such salts may seep out to the surface of the coating, causing drop-outs or an increase in the error rate.

Various inorganic powders other than carbon black may be added to the non-magnetic layer. Examples of the inorganic powders include needle-shaped non-magnetic iron oxide (a-Fe$_2$O$_3$), CaCO$_3$, titanium oxide, barium sulfate, and a-Al$_2$O$_3$. Preferably, the inorganic powder contains minimal amounts of water-soluble sodium ions and water-soluble calcium ions: water-soluble sodium ions are preferably contained in an amount of 70 ppm or less, more preferably 50 ppm or less. When contained in amounts greater than the specified range, the water-soluble sodium ions may form salts with organic acids (in particular, fatty acids) present in the coating. Such salts may-seep out to the surface of the coating, causing drop-outs or an increase in the error rate. To minimize the amounts of the water-soluble sodium ions and the water-soluble calcium ions, the inorganic powders may be washed with water.

The ratio by weight of the carbon black to the inorganic powders other than carbon black is preferably in the range of 100/0 to 5/95. If the proportion of the carbon black is less than 5 parts by weight, then the surface electric resistance is adversary affected.

Aside from the above-described materials, the lower non-magnetic layer may contain binders such as thermoplastic resins, thermosetting or thermoreactive resins, and radiation-curable (electron beam- or UV-curable) resins. These binder resins are used in proper combinations depending on the characteristics of the magnetic recording medium and the conditions for the process. The binders can be properly selected from those described with reference to the back coat layer.

The amount of the binder resin used in the lower non-magnetic layer is preferably in the range of 10 to 100 parts by weight, and more preferably 12 to 30 parts by weight, with respect to 100 parts by weight of the carbon black and the inorganic powders other than carbon black combined. Too small an amount of the binder may result in a decreased proportion of the binder resin in the lower non-magnetic layer and, thus, insufficient coating strength. Conversely, too large an amount of the binder may lead to a dispersion failure upon preparation of the coating for the lower non-magnetic layer. As a result, the desired flat non-magnetic layer surface can no longer be obtained.

When necessary, the lower non-magnetic layer contains a lubricant. Such a lubricant is properly selected from those described with reference to the back coat layer. While the amount of the lubricant in the lower non-magnetic layer can be adjusted depending on its purpose, the lubricant is preferably used in an amount of 1 to 20 parts by weight with respect to the total weight of the carbon black and the inorganic powders other than carbon black.

The coating for depositing the lower non-magnetic layer is prepared by adding an organic solvent to the above-described components. Such an organic solvent may be any organic solvent and is preferably selected from those described with reference to the back coat layer. The organic solvent is preferably used in an amount of 100 to 900 parts by weight with respect to 100 parts by weight of the carbon black, the various inorganic powders, and the binder resin combined.

The surface roughness of the lower non-magnetic layer (determined as the centerline average roughness Ra (JIS-B-0601)) must be of good condition. After smoothing, the lower non-magnetic layer preferably has an Ra value of 8.0 nm or less, more preferably 6.0 nm or less, and most preferably 5.0 nm or less. If the Ra value is larger than 8.0 nm, then the interface between the upper magnetic layer and the lower non-magnetic layer will become non-uniform, often resulting in a variation in the output.

The lower non-magnetic layer typically has a thickness of 0.1 to 2.5 $\mu$m, and preferably 0.3 to 2.3 $\mu$m. The lower non-magnetic layer, when too thin, becomes more likely to be affected by the surface roughness of the non-magnetic support. As a result, the surface smoothness of the non-magnetic layer is adversely affected, as is the surface smoothness of the magnetic layer. This often results in a decreased electromagnetic conversion characteristic. Also, too thin a non-magnetic layer leads to an increased light transmittance, causing problems when tape ends are detected by the changes in the light transmittance. On the other hand, making a non-magnetic layer thicker than a certain thickness would not correspondingly improve the performance of the magnetic recording medium.

[Upper Magnetic Layer]

The upper magnetic layer contains at least a ferromagnetic powder, a binder resin, and an abrasive having a Mohs hardness of 6 or above.

A preferred ferromagnetic powder for use in the present invention is a magnetic metal powder or a planar hexagonal fine powder. The magnetic metal powder preferably has a coersive force Hc of 118.5 to 237 kA/m (1500 to 3000 Oe), a saturation magnetization ss of 120 to 160 Am$^2$/kg (emu/g), an average major axis length of 0.05 to 0.2 $\mu$m, an average miner axis length of 10 to 20 nm, and an aspect ratio of 1.2 to 20. Also, the magnetic recording medium made by using the magnetic metal power preferably has an Hc value of 118.5 to 237 kA/m (1500 to 3000 Oe). The planar hexagonal fine powder preferably has a coersive force Hc of 79 to 237 kA/m (1000 to 3000 Oe), a saturation magnetization ss of 50 to 70 Am$^2$/kg (emu/g), an average planar particle size of 30 to 80 nm, and a plate ratio of 3 to 7. Also, the magnetic recording medium made by using the planar hexagonal fine powder preferably has an Hc value of 94.8 to 173.8 kA/m (1200 to 2200Oe).

The production of the magnetic metal powder uses a ferric oxyhydrate as a starting material. This material can be obtained by blowing an oxidative gas through an aqueous suspension of a ferrous salt and an alkali. A preferred ferric oxyhydrate is a-FeOOH. In a first process for producing a-FeOOH, a ferrous salt is neutralized with an alkali hydroxide to form an aqueous suspension of Fe(OH)$_2$, and an oxidative gas is then blown into the suspension to form a needle-shaped a-FeOOH product. In a second process for producing a-FeOOH, a ferrous salt is neutralized with an alkali carbonate to form an aqueous suspension of FeCO$_3$, and an oxidative gas is then blown into the suspension to form a spindle-shaped a-FeOOH product.

The ferrous salt for use in these processes may be any of ferrous chloride, ferrous nitride, and ferrous sulfate. The alkali hydroxide for use in the first process may be potassium hydroxide, sodium hydroxide, or aqueous ammonia. The alkali carbonate for use in the second process may be sodium carbonate, sodium bicarbonate, or ammonium carbonate.

In the first process, it is preferred to use 2 to 10 times as much alkali as required to neutralize the ferrous salt, so that the oxidation of Fe(OH)$_2$ takes place under highly basic conditions. The a-FeOOH product obtained in this manner is suitable for making a magnetic metal powder that is fine, has no branches, and offers a high dispersibility and a high packing ability. It is necessary that the process be carried out under highly basic conditions to ensure that the resulting particles are unbranched. As it is known, one way to control the particle size is by controlling the reaction temperature and the volume of the oxidative gas blown into the suspension. Alternatively, the particle size may be controlled by carrying out the neutralization of the ferrous salt with the alkali in the presence of a metal salt, such as a salt of Ni, Co, Al, and Si, and then carrying out the oxidation.

The second process tends to produce fine particles of a spindle-shaped, unbranched a-FeOOH product that have uniform particle sizes. In the second process, the particle size can be controlled by varying the ferrous concentration in the aqueous suspension, the reaction temperature, and the volume of the oxidative gas blown into the suspension. As with the first process, the particle size can also be controlled by the addition of Ni, Co, or the like.

One exemplary method for producing a magnetic metal powder will now be described in which the needle-shaped a-FeOOH product obtained in the first process is used as a starting material. First, ferrous salt is neutralized with twice as much or more of an alkaline hydroxide as is required to just neutralize the ferrous salt to form an alkaline suspension of Fe(OH)$_2$. An oxidative gas is then blown into the suspension to obtain a needle-shaped a-FeOOH product. To control the needle-shaped ratio and the shape of the a-FeOOH product, the ferrous salt may be doped with metals such as Ni, Co, Zn, Cr, Mn, Zr, Al, Si, P, Ba, Ca, Mg, Cu, Sr, Ti, Mo, Ag, and rare earth elements. These heterogenous metals may be uniformly mixed with the ferrous salt or they may be added during the reaction. The amounts added can be empirically determined by the desired shape and the size of the product.

In this process, the ferrous salt is neutralized with an alkali to form a suspension of Fe(OH)$_2$, which is then oxidized to produce a-FeOOH. By using twice as much or more of the alkaline as is required to neutralize the ferrous salt, the resultant a-FeOOH can be used as a starting material to produce a magnetic metal powder with high coersive force. While the degree of branching of the resulting a-FeOOH can be further reduced by adding the alkali in larger excess, the alkali, when added in excessive amounts of 10 times or more, does not further improve the effect and thus is not effective.

Also, it is necessary that the a-FeOOH particles required to produce a favorable magnetic metal powder have a size such that its specific surface area as measured in BET value falls within the range of 60 to 130 $m^2/g$. The specific surface area that is less than 60 $m^2/g$ indicates that the particles are too large to provide a high coersive force and thus are not suitable as a magnetic material used in a single wavelength region. In comparison, the specific surface area that is greater than 130 $m^2/g$ indicates that the particles are too small to provide a high coersive force although they may exhibit superparamagnetism. Too large a specific surface area also indicates a wide distribution of coersive force, which may be due to non-uniform particles.

Next, at least one of Ni, Co, Al, Si and rare earth elements is added to the a-FeOOH, which may or may not be doped with Ni, Co, Zn, Cr, Mn, Zr, Al, Si, P, Ba, Ca, Mg, Cu, Sr, Ti, Mo, Ag, and a rare earth element. The addition is typically carried out by neutralizing different metal salts with an acid or an alkali to deposit film of fine crystals of hydroxides on the surface of the particles. While Ni, Co, and rare earth elements may not have to be deposited on the surface of the a-FeOOH particles, provided that the a-FeOOH product is doped with sufficient amounts of the dopants, these elements may be further deposited on the surface of the particles when it is desired to increase the amounts of the elements present in the a-FeOOH product since the a-FeOOH product can only be doped to a limited degree. The metal elements are preferably present in the magnetic metal powder in the following ranges, where figures indicate the ratio by weight of each metal assuming the weight of iron to be 100:

Ni=0.3–8.0

Co=3.0–45.0

Al=0.5–8.0

Si=0.5–8.0 and rare earth element=0.2–10.0, provided that Al+Si=2.0–15.0.

The rare earth metal is at least one selected from the group consisting of La, Ce, Pr, Nd, Sm, Gd, Dy, and Y. The metals may be effectively used in combinations. Preferably, the metals are added in the form of water-soluble salts, such as chlorides, sulfates, and nitrates. Si is preferably added in the forms of sodium metasilicate, sodium orthosilicate, and water-glass. The metals are deposited in the following order: First, Ni and Co, which form an alloy and serve to control magnetic characteristics of the magnetic metal powder, are deposited, followed by deposition of Al and Si, which serve to prevent the sintering of the particles by heat. The rare earth metals, which act to increase a force, can achieve the effect more significantly when they are present internally, though they are somewhat effective when deposited with Al and/or Si.

After predetermined amounts of the metals have been deposited, the metals are thoroughly washed with water, are dried, and are then heat-treated at 300 to 800° C. in a non-reductive atomosphere. If the heat treatment is carried out at temperatures below 300° C., then the resulting a-$Fe_2O_3$ particles, generated in the dehydration of a-FeOOH, tend to contain numerous pores. As a result, the characteristics of the reduced magnetic metal powder are deteriorated. On the other hand, if the heat treatment is carried out at temperatures higher than 800° C., then the a-$Fe_2O_3$ particles start to melt and are deformed or sintered. As a result, the characteristics of the resulting magnetic metal powder are deteriorated.

Following the heat treatment, the magnetic metal powder is reduced at a temperature of 300° C. to 600° C. in a stream of hydrogen gas. This results in the formation of an oxide film on the surface of the particles and, as a result, the magnetic metal powder is obtained. To reduce the amounts of water-soluble sodium ions and water-soluble calcium ions in the magnetic metal powder, the purity of water for use in the above-described process may be increased, or a sodium- or calcium-free alkali may be used.

The following processes are known for the production of hexagonal ferrite. Any of these processes may be properly used.

(i) Glass crystallization technique, in which barium oxide, iron oxide, a metal oxide to replace iron, and boron oxide as a glass-forming material are mixed to form a ferrite composition, which in turn is melted and is then quenched to form an amorphous body. Subsequently, the amorphous body is again subjected to a heat treatment, is washed, and is then crashed into a barium ferrite crystal powder.

(ii), Aqueous heat reaction technique, in which a solution of metal salts of barium ferrite composition is neutralized with an alkali, followed by removal of the by-products. The solution is then heated at 100° C. or above and is subsequently washed, dried, and then crashed into a barium ferrite crystal powder.

(iii) Co-precipitation technique, in which a solution of metal salts of barium ferrite composition is neutralized with an alkali, followed by removal of the by-products. The solution is subsequently dried, is treated at 1100° C. or below, and is then crashed into a barium ferrite crystal powder.

To reduce the amounts of water-soluble sodium ions and water-soluble calcium ions in the hexagonal ferrite powder, the purity of water for use in each of the above-described processes (i), (ii), and (iii) may be increased, or a sodium- or calcium-free alkali may be used.

The ferromagnetic powder preferably contains the water-soluble sodium ions in an amount of 70 ppm or less, more preferably 50 ppm or less. Also, the ferromagnetic powder preferably contains the water soluble-calcium ion in an amount of 30 ppm or less, mote preferably 20 ppm or less. When contained in amounts greater than the specified range, these ions may form salts with organic acids (in particular, fatty acids) present in the coating. Such salts may seep out to the surface of the coating, causing drop-outs or an increase in the error rate.

Preferably, such a ferromagnetic powder is contained in an amount of about 70 to 90 wt % with respect to the magnetic layer. Too large an amount of the ferromagnetic powder leads to a decreased amount of the binder and tends to result in a decreased surface smoothness after calendering. Conversely, too small an amount of the ferromagnetic powder cannot achieve high reproduction output.

The magnetic layer may contain any suitable binder, such as a thermoplastic resin, thermosetting or thermoreactive resin, and radiation-curable (electron beam- or UV-curable)

resin. These binder resins are used in proper combinations depending on the characteristics of the magnetic recording medium and the conditions for the process. The binders can be properly selected from those described with reference to the back coat layer.

The amount of the binder resin used in the magnetic layer is preferably in the range of 5 to 40 parts by weight, and more preferably 10 to 30 parts by weight, with respect to 100 parts by weight of the ferromagnetic powder. Too small an amount of the binder may result in a decreased strength and, thus, a decreased running durability of the magnetic layer. Conversely, too large an amount of the binder may lead to a decreased amount of the ferromagnetic powder, thus lowering the electromagnetic conversion characteristics.

The magnetic layer further contains an abrasive having a Mohs hardness of 6 or higher for the purposes of increasing the mechanical strength of the magnetic layer and preventing clogging of the magnetic head. Examples of the abrasives are those with a Mohs hardness of 6 or higher, preferably 9 or higher, including a-alumina (Mohs hardness=9), chromium oxide (Mohs hardness=9), silicon carbide (Mohs hardness=9.5), silicon oxide (Mohs hardness=7), aluminum nitride (Mohs hardness=9), and boron nitride (Mohs hardness=9.5). Preferably, at least one of these abrasives is added to the magnetic layer. The abrasives are generally amorphous and thus serve to prevent clogging of the magnetic head and to increase the coating strength.

The abrasive has an average particle size of for example 0.01 to 0.3 µm, preferably 0.05 to 0.2 µm. If the average particle size of the abrasive is too large, then the projections from the surface of the magnetic layer become significant, causing a decrease in the electromagnetic conversion characteristics, an increase in the drop-outs, and an increase in the head wear. Conversely, if the average particle size of the abrasive is too small, then the protrusions from the surface of the magnetic layer will become relatively small, leading to insufficient prevention of clogged heads.

In general, the average particle size is measured using a transmission electron microscope. The amount of the abrasive is typically in the range of 3 to 25 parts by weight, preferably in the range of 5 to 20 parts by weight, with respect to 100 parts by weight of the ferromagnetic powder.

With the average particle size and the amount of the abrasive falling within the respective ranges, and with the centerline average roughness Ra of the magnetic layer falling within the range of 1.0 to 8.0 nm, the SENDUST abrasion volume $S_{MC}$ by the magnetic layer can be adjusted to $3.0 \times 10^4$ (µm)$^3$/m or below, the range that meets the standard for the head abrasion in magnetic recording systems.

When necessary, the magnetic layer may further contain a dispersing agent, such as a surfactant, a lubricant, such as a higher fatty acid, a fatty acid ester and, a silicone oil, and various other additives.

A preferred coating for depositing the magnetic layer can be prepared by adding an organic solvent to the above-described components. Such an organic solvent may be any suitable organic solvent and may be those used in the lower non-magnetic layer.

The magnetic layer, which serves as a upper layer of the magnetic recording medium, typically has a thickness of 0.30 µm or less, preferably 0.05 to 0.30 µm or less, and more preferably 0.10 to 0.25 µm. The magnetic layer that is too thick can result in an increase in the self-demagnetization loss and the thickness loss.

[Non-Magnetic Support]

The non-magnetic support may be formed from any suitable material selected from various flexible materials and rigid materials depending on its purposes and may be sized and shaped into a desired size and shape, such as tape-like'shape, depending on the standard that the support is required to meet. For example, a preferred flexible material may be a polyester, such as polyethylene terephthalate, or polyethylene naphthalate; a polyolefin, such as polypropylene; or various other resins, such as polyamide, polyimide, and polycarbonate.

Preferably, the non-magnetic support is 3.0 to 15.0 µm thick and may be shaped into any desired shape, such as tape-, sheet-, card-, or dick-like shape. The non-magnetic support can be made from various materials selected to suit its shape and requirements.

The non-magnetic support for use in the present invention typically has a surface roughness as measured in the centerline average surface roughness Ra of 20 nm or less, preferably 15 nm or less. If necessary, the surface roughness of the non-magnetic support can be adjusted as desired depending on the size and the amount of the filler added to the non-magnetic support. Examples of the fillers include oxides and carbonates of Ca, Si, Ti, and Al, and fine powders of organic resins such as acryl-based resins. Particularly preferred are combinations of $Al_2O_3$ and organic resin fine powders.

[Production Process]

The magnetic recording medium of the present invention can be produced by applying to one surface of the non-magnetic support either a coating for the magnetic layer alone or a coating for the lower non-magnetic layer and subsequently a coating for the magnetic layer; and applying to the other surface of the non-magnetic support a coating for the back coat layer.

Each of the processes for producing the coatings for the back coat layer, the lower non-magnetic layer, and the magnetic layer involves at least a kneading step and a dispersing step, and other optional steps that are carried out before or after each of the first two steps, including a mixing step, a viscosity-adjusting step, and a filtration step. Each step may consist of two or more sub-steps. Any of the materials for use in the present invention, including the ferromagnetic powder, the non-magnetic inorganic powder, the binder, the abrasive, the carbon black, the lubricant, and the solvent, may be added at the beginning of, or during, any of the aforementioned steps. Each material may be added in two or more separate steps.

For kneading/dispersing of each coating, known production techniques can be used during part of, or throughout, the step. For the kneading step, however, it is preferred to use a high-power kneader such as a continuous kneader or a pressure kneader. A continuous kneader or a pressure kneader is used to knead/mix the ferromagnetic powder or the non-magnetic inorganic powder, the binder, and a small amount of the solvent. The slurry is preferably kneaded at a temperature of 50° C. to 110° C.

A dispersion medium having a high specific gravity is preferably used in each coating. Preferred examples include ceramic medium such as zirconia and titania. Conventional glass beads are undesirable since upon dispersing, the beads wear to produce water-soluble sodium ions and water-soluble calcium ions as impurities of the coating.

Two techniques are known for the production of the magnetic recording medium that has the lower non-magnetic layer and the upper magnetic layer: wet-on-dry technique and wet-on-wet technique. In the wet-on-dry technique, the coating for the-lower non-magnetic layer is first applied to one surface of the non-magnetic support. This first coating is dried, is subjected to a surface-smoothing treatment and is then cured. Subsequently, the coating for the upper magnetic layer is applied. In the wet-on-wet technique, the coating for the upper magnetic layer is applied while the lower non-magnetic layer is still wet. Of the two techniques, the former is preferred to the latter in view of the uniformity of the interface between the upper magnetic layer and the lower non-magnetic layer. The back coat layer may be applied either before, during, or after the application of the lower non-magnetic layer and the upper magnetic layer.

While the coating may be applied using for example any of a gravure coater, a reverse coater, or an extrusion nozzle, a die nozzle coater is particularly preferred in terms of its maneuverability and productivity.

In producing a magnetic tape in accordance with the present invention, it is preferred to apply a magnetic field after deposition of the magnetic layer to orient the magnetic particles in the layer. Depending on the purpose of the magnetic recording medium, the orientation of the particles may be either parallel, perpendicular, or oblique to the direction along which the recording medium is moved. The particles are preferably oriented by applying a 100 G or stronger magnetic field by means of a permanent magnet, such as a ferrite magnet and a rare earth metal magnet, an electromagnet, or a solenoid, or a combination of these magnetic field-generating means. To maximize the degree of orientation after drying, a moderate drying step may be provided prior to the orientation step, or drying may be carried out during the orientation step. In producing a floppy disk, the magnetic particles, which tend to spontaneously orient themselves upon application, are made into non-oriented state to a maximum degree by means such as a permanent magnet, an electromagnet or a solenoid.

Following the application and the subsequent orientation of the magnetic layer, the magnetic layer is dried/fixed by using known dry/evaporation means such as a hot air stream heater, a far infrared heater, an electric heater, or a vacuum apparatus, which is typically placed in a drying oven. The temperature for drying may vary from room temperature to about 300° C. depending upon factors such as the heat-resistivity of the non-magnetic support, the type and the concentration of the solvent. Alternatively, a temperature gradient may be established in a drying oven. A preferred gas atmosphere in the drying oven is air or an inert gas.

Subsequent to the drying of the magnetic layer, calendering may be carried out as a surface-smoothing treatment, if necessary. A preferred calender roll system may be a combination (in three to seven steps) of metal rolls and heat-resistant plastic rolls, such as epoxy-, polyester-, nylon-, polyimide-, polyamide-, or polyimideamide-made plastic rolls (carbon, metals, or other inorganic compounds may be blended with the heat-resistant plastics). A combination of metal rolls may also be used.

Calendering is preferably carried out at a temperature of 90° C. or above, and more preferably 100° C. or above. Linear pressure is preferably 200 kg/cm or higher, and more preferably 250 kg/cm or higher. The speed of the process is in the range of 20 m/min to 900 m/min. According to the present invention, the magnetic layer can be effectively smoothed by carrying out the calendering process at a temperature of 100° C. or above and a linear pressure of 250 kg/cm or higher. As a result, the SENDUST abrasion volume by the magnetic layer $S_{MC}$ of $10 \times 10^4$ $(\mu m)^3/m$ or below can be achieved.

EXAMPLES

The present invention will now be described in detail with reference to examples, which are not intended to limit the scope of the invention in any way.

Example 1

<Preparation of a coating for magnetic layer>
(Preparation of binder solution)

| | |
|---|---|
| Vinyl chloride type resin (ZEON Corporation, MR-110, solid resin content = 100 wt %) | 11 parts by weight |
| Polyester polyurethane resin (TOYOBO, UR-8300, solid resin content = 30 wt %) | 17 parts by weight |
| Methyl ethyl ketone (MEK) | 7 parts by weight |
| Toluene | 7 parts by weight |
| Cyclohexanone | 7 parts by weight |

The composition above was placed in a hyper mixer and was mixed/stirred to form a binder solution.

(Kneading)

The following composition was placed in a pressure kneader and was kneaded for 2 hours.

| | |
|---|---|
| a-Fe magnetic powder (Metal powder 1) (Hc = 149 kA/m (1885Oe), ss = 138 Am²/kg(emu/g), BET = 58 m²/g, average major axis length = 0.10 μm) | 100 parts by weight |
| a-Al$_2$O$_3$ (SUMITOMO CHEMICAL Co., Ltd., HIT-60A, average particle size = 0.20 μm) | 6 parts by weight |
| a-Al$_2$O$_3$ (SUMITOMO CHEMICAL Co., Ltd., HIT-82, average particle size = 0.13 μm) | 6 parts by weight |
| Binder solution | 49 parts by weight |

To the slurry resulting after the kneading process, the following composition was added to optimize the viscosity of the slurry for the dispersing process.

| | |
|---|---|
| MEK | 100 parts by weight |
| Toluene | 100 parts by weight |
| Cyclohexanone | 75 parts by weight |

(Dispersing)

The resulting slurry was subjected to a dispersing process in a horizontal pin mill filled to 75% capacity with zirconia beads (TORAY, torayceram f 0.8 mm).

(Viscosity-Adjusting Solution)

The following composition was placed in a hyper mixer and was mixed/stirred for 1 hour to form a viscosity-adjusting solution.

| | |
|---|---|
| Stearic acid | 1 part by weight |
| Butyl stearate | 1 part by weight |
| MEK | 100 parts by weight |
| Toluene | 100 parts by weight |
| Cyclohexanone | 250 parts by weight |

(Viscosity Adjustment)

To the slurry resulting after the dispersing process, the solution prepared above was added, and the mixture was mixed/stirred and was again subjected to the dispersing process in a horizontal pin mill, filled to 75% capacity with zirconia beads (TORAY, torayceram f 0.8 mm), to obtain a coating. The coating was circulated for filtration through a depth filter with an absolute filtration accuracy of 1.0 μm.

(Final Coating)

To 100 parts by weight of the coating resulting after filtration, 0.82 part by weight of an isocyanate compound (NIPPON POLYURETHANE INDUSTRY Co., Ltd., Coronate L) were added. The mixture was mixed/stirred and was then circulated for filtration through a depth filter with an absolute filtration accuracy of 1.0 μm to obtain a final coating product for the magnetic layer.

<Preparation of a coating for lower non-magnetic layer>
(Preparation of binder solution)

| | |
|---|---|
| Electron beam-curable vinyl chloride type resin (Solid content = 30 wt %) (vinyl chloride-epoxy-containing monomer copolymer, average degree of polymerization = 310, epoxy content = 3 wt %, S content = 0.6 wt %, acryl content = 6 units/1 molecule, Tg = 60° C.) | 45 parts by weight |
| Electron beam-curable polyester polyurethane resin (—$SO_3$ Na-containing polyester polyurethane, number average molecular weight = 26000) | 16 parts by weight |
| MEK | 2 parts by weight |
| Toluene | 2 parts by weight |
| Cyclohexanone | 2 parts by weight |

The composition above is placed in a hyper mixer and was stirred to form a binder solution.

(Kneading)

The following composition was placed in a pressure kneader and was kneaded for 2 hours.

| | |
|---|---|
| Needle-shaped a-$Fe_2O_3$ (TODA KOGYO, DB-65, average major axis length = 0.11 μm, specific surface area = 53 m²/g) | 85 parts by weight |
| Carbon black (MITSUBISHI CHEMICAL Co. Ltd., #850B, average particle size = 16 nm, specific surface area = 200 m²/g, DPB oil absorbance = 70 ml/100 g) | 15 parts by weight |
| Orthophthalic acid | 2 parts by weight |
| Binder solution | 67 parts by weight |

To the slurry resulting after the kneading process, the following composition was added to optimize the viscosity of the slurry for the dispersing process.

| | |
|---|---|
| MEK | 40 parts by weight |
| Toluene | 40 parts by weight |
| Cyclohexanone | 40 parts by weight |

(Dispersing)

The resulting slurry was subjected to a dispersing process in a horizontal pin mill filled to 75% capacity with zirconia beads (TORAY, torayceram f 0.8 mm).

(Viscosity-Adjusting Solution)

The following composition was placed in a hyper mixer and was stirred to form a viscosity-adjusting solution.

| | |
|---|---|
| Stearic acid | 1 part by weight |
| Butyl stearate | 1 part by weight |
| MEK | 30 parts by weight |
| Toluene | 30 parts by weight |
| Cyclohexanone | 30 parts by weight |

(Viscosity Adjustment and Final Coating)

To the slurry resulting after the dispersing process, the solution prepared above was added, and the mixture was mixed/stirred and was again subjected to the dispersing process in a horizontal pin mill, filled to 75% capacity with zirconia beads (TORAY, torayceram f 0.8 mm), to obtain a coating. The coating was circulated for filtration through a depth filter with an absolute filtration accuracy of 1.0 μm. This gave a final coating product for the lower non-magnetic layer.

<Preparation of a coating for vinyl chloride/polyurethane-based back coat layer>
(Preparation of binder solution)

| | |
|---|---|
| Vinyl chloride-vinyl acetate-vinyl alcohol copolymer (Monomer ratio by weight = 92:3:5, average degree of polymerization = 420) | 65 parts by weight |
| Polyester polyurethane resin (TOYOBO, UR-8300, solid resin content = 30 wt %) | 117 parts by weight |
| MEK | 233 parts by weight |
| Toluene | 233 parts by weight |
| Cyclohexanone | 233 parts by weight |

The composition above was placed in a hyper mixer and was mixed/stirred to form a binder solution.

(Dispersing)

The following composition was placed in a ball mill and was processed for 24 hours to thoroughly disperse the components.

| | |
|---|---|
| Carbon black (CABOT Co., Ltd., BLACK PEARLS 800, average particle size = 17 nm, BET = 220 m²/g) | 75 parts by weight |
| Carbon black (CABOT Co., Ltd., BLACK PEARLS 130, average particle size = 75 nm, BET = 25 m²/g) | 10 parts by weight |
| $BaSO_4$ (SAKAI CHEMICAL INDUSTRY Co., Ltd., BF-20, average particle size = 30 nm) | 15 parts by weight |
| Binder solution | 880 parts by weight |

(Viscosity-Adjusting Solution)

The following composition was placed in a hyper mixer and was stirred to form a viscosity-adjusting solution.

| | |
|---|---|
| Stearic acid | 1 part by weight |
| Myristic acid | 1 part by weight |
| Butyl stearate | 2 parts by weight |
| MEK | 210 parts by weight |
| Toluene | 210 parts by weight |
| Cyclohexanone | 210 parts by weight |

(Viscosity Adjustment)

To the slurry resulting after the dispersing process, the solution prepared above was added, and the mixture was mixed/stirred and was again subjected to the dispersing process for 3 hours in a ball mill. The resultant coating was circulated for filtration through a depth filter with an absolute filtration accuracy of 3.0 μm.

(Final Coating)

To 100 parts by weight of the coating resulting after filtration, 1 part by weight of an isocyanate compound (NIPPON POLYURETHANE INDUSTRY Co., Ltd., Coronate L) was added. The mixture was mixed/stirred and was then circulated for filtration through a depth filter with an absolute filtration accuracy of 3.0 μm to obtain a coating for the back coat layer.

<Production of Magnetic Recording Medium>

The above-prepared coating for the lower non-magnetic layer was applied to one surface of a 6.1 μm thick polyethylene terephthalate film at a line speed of 100 m/min to a dry thickness of 2.0 μm. The film was then dried in an oven into which a 100° C. hot air stream was sent at a speed of 15 m/sec. Subsequently, the film was irradiated with an electron beam at a dose of 4.5 Mrad and was then wound.

The above-prepared coating for the magnetic layer was then applied over the cured lower non-magnetic layer at a line speed of 100 m/min to a dry thickness of 0.20 μm. While still wet, the coating was exposed to a magnetic field generated by a solenoid (395 kA/m (5000 Oe)) to orient the magnetic powder and was dried in an oven into which a 100° C. hot air stream was sent at a speed of 15 m/sec.

Subsequently, the above-prepared coating for the back coat layer was applied to the other surface of the polyethylene terephthalate film to a dry thickness of 0.6 μm. The film was then dried in a furnace into which a 100° C. hot air stream was sent at a speed of 15 m/sec and was then wound. The film was then subjected to calendering under the following conditions: 100° C., 2940 N/cm (300 kg/cm), 10 nips, processing speed=100 m/min. The film was then wound. The wound film web was placed in an oven for 24 hours at 60° C. and was then slit into ½ inches (12.65 mm) wide strips to obtain a magnetic tape.

Example 2

A magnetic tape was obtained in the same manner as in Example 1, except that following the-application and the drying of the coating for the back coat layer, the-film was subjected to calendering under the following conditions: 100° C., 3430 N/cm (350 kg/cm), 10 nips, processing speed= 100 m/min.

Example 3

A magnetic tape was obtained in the same manner as in Example 1, except that following the application and the drying of the coating for the back coat layer, the film was subjected to calendering under the following conditions: 110° C., 3430 N/cm (350 kg/cm), 10 nips, processing speed=100 m/min.

Comparative Example 1

A magnetic tape was obtained in the same manner as in Example 1, except that following the application and the drying of the coating for the magnetic layer, the film was subjected to calendering under the following conditions: 100° C., 2940 N/cm (300 kg/cm), 10 nips, processing speed=100 m/min, and the film was not subjected to calendering after the application and the drying of the coating for the back coat layer.

Comparative Example 2

A magnetic tape was obtained in the same manner as in Example 1, except that following the application and the drying of the coating for the back coat layer, the film was subjected to calendering twice under the following conditions: 110° C., 3430 N/cm (350 kg/cm), 10 nips, processing speed=100 m/min.

Example 4

A magnetic tape was made in the same manner as in Example 1, except that the coating for the back coat layer was replaced with the following composition:

| <Preparation of a coating for nitrocellulose/polyurethane-based back coat layer> (Preparation of binder solution) | |
|---|---|
| Nitrocellulose resin (ASAHI KASEI, Celnova Bth-1/2, solid resin content = 70 wt %) | 71 parts by weight |
| Polyester polyurethane resin (TOYOBO, UR-8300, solid resin content = 30 wt %) | 110 parts by weight |
| MEK | 193 parts by weight |
| Toluene | 193 parts by weight |
| Cyclohexanone | 193 parts by weight |

The composition above was placed in a hyper mixer and was stirred to form a binder solution.

(Dispersing)

The following composition was placed in a ball mill and was processed for 24 hours to thoroughly disperse the components.

| | |
|---|---|
| Carbon black (CABOT Co., Ltd., BLACK PEARLS 800, average particle size = 17 nm, BET = 220 m$^2$/g) | 90 parts by weight |
| Carbon black (CABOT Co., Ltd., BLACK PEARLS 130, average particle size = 75 nm, BET = 25 m$^2$/g) | 10 parts by weight |
| Copper oleate | 5 parts by weight |
| Copper phthalocyanine | 5 parts by weight |
| a-Al$_2$O$_3$ (TAIMEI CHEMICALS Co., Ltd., TM-DR, average particle size = 0.23 μm) | 1 part by weight |
| Binder solution | 760 parts by weight |

(Viscosity-Adjusting Solution)

The following composition was placed in a hyper mixer and was stirred to form a viscosity-adjusting solution.

| | |
|---|---|
| MEK | 220 parts by weight |
| Toluene | 220 parts by weight |
| Cyclohexanone | 220 parts by weight |

(Viscosity Adjustment)

To the slurry resulting after the dispersing process, the solution prepared above was added, and the mixture was mixed/stirred and was again subjected to the dispersing process for 3 hours in a ball mill. The resultant coating was circulated for filtration through a depth filter with an absolute filtration accuracy of 3.0 μm.

(Final Coating)

To 100 parts by weight of the coating resulting after filtration, 1.1 parts by weight of an isocyanate compound (NIPPON POLYURETHANE INDUSTRY Co., Ltd., Coronate L) was added. The mixture was mixed/stirred and was then circulated for filtration through a depth filter with an absolute filtration accuracy of 3.0 μm to obtain a coating for the back coat layer.

Example 5

A magnetic tape was made in the same manner as in Example 4, except that 0.5 part by weight of a-$Al_2O_3$ was used in the coating for the back coating layer.

Example 6

A magnetic tape was made in the same manner as in Example 4, except that 2 parts by weight of a-$Fe_2O_3$ was used in place of a-$Al_2O_3$ in the coating for the back coating layer.

Example 7

A magnetic tape was made in the same manner as in Example 5, except that the amount of carbon black in the coating for the back coat layer was changed to 75 parts by weight and 15 parts by weight of $CaCO_3$ was used in place of a-$Al_2O_3$.

Example 8

A magnetic tape was made in the same manner as in Example 7, except that 15 parts by weight of $BaSO_4$ was used in place of the 15 parts by weight of $CaCO_3$, a soft inorganic powder, in the coating for the back coat layer.

Example 9

A magnetic tape was made in the same manner as in Example 4, except that 100 parts by weight of an a-Fe magnetic powder (Metal powder 2) (Hc=143.8 kA/m (1820 Oe), ss=130 $Am^2$/kg(130 emu/g), BET=57 $m^2$/g, average major axis length=0.10 μm) was used in place of the 100 parts by weight of the a-Fe magnetic powder (Metal powder 1).

Comparative Example 3

A magnetic tape was made in the same manner as in Example 4, except that 2 parts by weight of a-$Al_2O_3$ was used in the coating for the back coating layer.

Comparative Example 4

(Preparation of a Coating for Magnetic Layer)

All procedures up to the dispersion process were exactly the same as in Example 1.

(Viscosity-Adjusting Solution)

The following composition was placed in a hyper mixer and was mixed/stirred for 1 hour to form a viscosity-adjusting solution.

| | |
|---|---|
| Stearic acid | 1 part by weight |
| Butyl stearate | 1 part by weight |
| MEK | 30 parts by weight |
| Toluene | 30 parts by weight |
| Cyclohexanone | 30 parts by weight |

(Viscosity Adjustment)

To the slurry resulting after the dispersing process, the solution prepared above was added, and the mixture was mixed/stirred and was again subjected to the dispersing process in a horizontal pin mill, filled to 75% capacity with zirconia beads (TORAY, torayceram f 0.8 mm), to obtain a coating. The coating was circulated for filtration through a depth filter with an absolute filtration accuracy of 1.0 μm.

(Final Coating)

To 100 parts by weight of the coating resulting after filtration, 1.3 parts by weight of an isocyanate compound (NIPPON POLYURETHANE INDUSTRY Co., Ltd., Coronate L) were added. The mixture was mixed/stirred and was then circulated for filtration through a depth filter with an absolute filtration accuracy of 1.0 μm to obtain a final coating product for the magnetic layer.

<Production of Magnetic Recording Medium>

The coating for the back coat layer was the same as that prepared in Example 1.

The above-prepared coating for the magnetic layer was applied to one surface of a 6.1 μm thick polyethylene terephthalate film at a line speed of 100 m/min to a dry thickness of 2.5 μm. While still wet, the coating was exposed to a magnetic field by passing through a solenoid (395 kA/m (5000 Oe)) to orient the magnetic powder and was dried in an oven into which a 100° C. hot air stream was sent at a speed of 15 m/sec. Subsequently, the film was subjected to calendering under the following conditions: 100° C., 2940 N/cm (300 kg/cm), 10 nips, processing speed= 100 m/min.

The coating for the back coat layer was then applied to the other surface of the polyethylene terephthalate film to a dry thickness of 0.5 μm. The film was then dried in an oven into which a 100° C. hot air stream was sent at a speed of 15 m/sec and was then wound. Without being subjected to calendering, the wound film web was placed in an oven for 24 hours at 60° C. and was then slit into ½ inches (12.65 mm) wide strips to obtain a magnetic tape.

Comparative Example 5

A magnetic tape was obtained in the same manner as in Example 4, except that the pressure condition for the calendering process that followed the application and the drying of the coating for the magnetic layer was changed to 3430 N/cm (350 kg/cm).

[Evaluation of Magnetic Tape]

(Centerline Average Surface Roughness: Ra(nm))

Using TALYSTEP system (Taylor Hobson), the centerline average roughness Ra was determined for the surface of the back coat layer and the surface of the magnetic layer. Measurements were taken according to JIS-B-0601. The conditions for the measuring instrument were as follows: filter condition=0.18–9 Hz; probe=0.1×2.5 μm stylus; probe pressure=1.96×10⁻⁵N (2 mg); measurement speed= 0.03 mm/sec; and measured length=500 μm.

(AFM Centerline Average Surface Roughness: Ra(nm))

Using AutoProbe M5 atomic force microscope (AFM) (Thermo Microscopes), the AFM average surface roughness Ra was determined. The results are shown in Table 1.
The number of times that the analysis was performed: N=3
Probe: Silicon single crystal probe (Nanosensors)
Scan mode: non-contact mode
Scan area: 10 μm×10 μm
Pixel number: 512×512 data points
Scan rate: 0.6 Hz
Measurement environment: at room temperature in the atmosphere
Data processing: Secondary slope correction was performed along horizontal and vertical directions for the whole image data.

(SENDUST Abrasion Volume)

In the manner as described above, the SENDUST abrasion volume by the back coat layer $S_{BC}$ $((\mu m)^3/m)$) and the SENDUST abrasion volume by the magnetic layer $S_{MC}$ $((\mu m)^3/m)$) were determined.

(Coating Abrasion)

Each magnetic tape was passed 100,000 times on SDLT220 drive, a data storage system, and was observed with a microscope (×100) for the degree of abrasion on the back coat layer and the magnetic layer. Ratings were given on the following scale:

AA: no scratches were observed

A: one or no scratch-was observed per field of vision at ×100 magnification

B: 2 to 10 scratches were observed per field of vision at ×100 magnification

C: 11 or more scratches were observed per field of vision at ×100 magnification.

(Error Rate)

To determine the error rate, data were written using a MIG head (head width: 24 μm) on all tracks throughout the length of the tape and were subsequently read out using an MR head (head width: 14 μm). The minimum recording wavelength was 0.37 μm and the number of tracks was 450. For the magnetic tape of Comparative Example 4, the ability of the magnetic layer to abrade was so high that a smear was formed on MR head, making the measurement of the error rate impossible.

The results of the analysis are shown in Tables 1 and 2.

TABLE 1

| | Lower non-magnetic layer | Magnetic powder of magnetic layer MC | Back coat layer BC | | | | | | SENDUST abrasion volume $(\times 10^4 (\mu m)^3/m)$ | | |
|---|---|---|---|---|---|---|---|---|---|---|---|
| | | | Carbon black | Parts by weight | Inorganic powder | Parts by weight | Binder resin | Parts by weight* | $S_{BC}$ | $S_{MC}$ | $S_{BC}/S_{MC}$ |
| Comparative Example 1 | Disposed | Metal powder 1 | BP800 + BP130 | 75 10 | BaSO₄ | 15 | Vinyl chloride/ polyurethane | 100 | 4.0 | 1.2 | 3.3 |
| Example 1 | | | | | | | | | 3.2 | 1.2 | 2.7 |
| Example 2 | | | | | | | | | 2.1 | 1.2 | 1.8 |
| Example 3 | | | | | | | | | 0.7 | 1.2 | 0.6 |
| Comparative Example 2 | | | | | | | | | 0.4 | 1.1 | 0.4 |
| Comparative Example 3 | | | BP800 + BP130 | 90 10 | Al₂O₃ | 2 | Nitro-cellulose/ polyurethane | 83 | 4.2 | 1.2 | 3.5 |
| Example 4 | | | | | Al₂O₃ | 1 | | | 1.6 | 1.2 | 1.3 |
| Example 5 | | | | | Al₂O₃ | 0.5 | | | 1.2 | 1.2 | 1.0 |
| Example 6 | | | | | Fe₂O₃ | 2 | | | 1.2 | 1.2 | 1.0 |
| Example 7 | | | BP800 + BP130 | 75 10 | CaCO₃ | 15 | | | 0.8 | 1.2 | 0.7 |
| Example 8 | | | | | BaSO₄ | 15 | | | 0.9 | 1.2 | 0.8 |
| Example 9 | Disposed | Metal powder 2 | BP800 + BP130 | 90 10 | Al₂O₃ | 1 | | | 1.6 | 0.9 | 1.8 |
| Comparative Example 4 | Non-disposed | Metal powder 1 | BP800 + BP130 | 75 10 | BaSO₄ | 15 | Vinyl chloride/ Polyurethane | 100 | 4.0 | 3.0 | 1.3 |
| Comparative Example 5 | | | | | | | | | 4.0 | 2.4 | 1.7 |

*Parts by weight of solid resin content

TABLE 2

| | SENDUST abrasion volume $(\times 10^4 (\mu m)^3/m)$ | | | Surface roughness Ra(nm) | | AFM surface roughness Ra(nm) | Coating abrasion after durability testing | | Initial error rate (errors/ MB) | Error rate after durability testing (errors/ MB) |
|---|---|---|---|---|---|---|---|---|---|---|
| | $S_{BC}$ | $S_{MC}$ | $S_{BC}/S_{MC}$ | BC | MC | MC | BC | MC | | |
| Comparative Example 1 | 4.0 | 1.2 | 3.3 | 23.4 | 5.1 | 5.5 | B | AA | 1.5 | 3.1 |
| Example 1 | 3.2 | 1.2 | 2.7 | 18.5 | 5.0 | 5.5 | A | AA | 0.8 | 1.0 |

TABLE 2-continued

| | SENDUST abrasion volume ($\times 10^4 (\mu m)^3/m$) | | | Surface roughness Ra(nm) | | AFM surface roughness Ra(nm) | Coating abrasion after durability testing | | Initial error rate (errors/ MB) | Error rate after durability testing (errors/ MB) |
|---|---|---|---|---|---|---|---|---|---|---|
| | $S_{BC}$ | $S_{MC}$ | $S_{BC}/S_{MC}$ | BC | MC | MC | BC | MC | | |
| Example 2 | 2.1 | 1.2 | 1.8 | 12.2 | 4.9 | 5.5 | AA | A | 0.5 | 0.7 |
| Example 3 | 0.7 | 1.2 | 0.6 | 10.0 | 4.9 | 5.5 | AA | A | 0.8 | 1.0 |
| Comparative Example 2 | 0.4 | 1.1 | 0.4 | 7.2 | 4.8 | 5.5 | AA | C | 1.0 | 1.8 |
| Comparative Example 3 | 4.2 | 1.2 | 3.5 | 16.1 | 5.0 | 5.5 | B | AA | 1.0 | 1.9 |
| Example 4 | 1.6 | 1.2 | 1.3 | 15.5 | 4.9 | 5.5 | AA | AA | 0.5 | 0.6 |
| Example 5 | 1.2 | 1.2 | 1.0 | 14.9 | 4.9 | 5.5 | AA | AA | 0.5 | 0.7 |
| Example 6 | 1.2 | 1.2 | 1.0 | 15.5 | 4.9 | 5.5 | AA | AA | 0.5 | 0.7 |
| Example 7 | 0.8 | 1.2 | 0.7 | 13.1 | 4.9 | 5.5 | AA | A | 0.5 | 0.9 |
| Example 8 | 0.9 | 1.2 | 0.8 | 14.5 | 4.9 | 5.5 | AA | A | 0.5 | 0.8 |
| Example 9 | 1.6 | 0.9 | 1.8 | 14.0 | 3.9 | 4.5 | AA | AA | 0.3 | 0.6 |
| Comparative Example 4 | 4.0 | 3.0 | 1.3 | 23.4 | 7.0 | 8.1 | AA | AA | Impossible to measure* | — |
| Comparative Example 5 | 4.0 | 2.4 | 1.7 | 23.4 | 6.2 | 6.5 | AA | AA | 2.0 | 8.5 |

*For the magnetic tape of Comparative Example 4, the ability of the magnetic layer to abrade was so high that a smear was formed on MR head, making the measurement of the error rate impossible.

As can be seen from Tables 1 and 2, each of the magnetic tapes of Examples 1 through 9 suffered only a minor abrasion on the back coat layer (BC) and the magnetic layer (MC) and proved to have excellent running durability. Each of the magnetic tapes of Examples 1 through 9 also proved to be advantageous in terms of the error rate.

In comparison, the magnetic tapes of Comparative Examples 4 and 5, which lacked the lower non-magnetic layer, were less favorable in terms of the error rate. In the magnetic tapes of Comparative Examples 1 and 3, each of which had its value of $S_{BC}/S_{MC}$ falling outside the range specified by the present invention, the coating strength of the back coat layer was so much higher as compared to the coating strength of the magnetic layer that the magnetic layer suffered significant scratches after durability testing. In the magnetic tape of Comparative Example 2, which also had its value of $S_{BC}/S_{MC}$ falling outside the range specified by the present invention, the coating strength of the magnetic layer was so much higher as compared to the coating strength of the back coat layer that the back coat layer suffered significant scratches after durability testing.

What is claimed is:

1. A magnetic recording medium, comprising a lower non-magnetic layer on one surface of a non-magnetic support, an upper magnetic layer on the lower non-magnetic layer, and a back coat layer on the other surface of the non-magnetic support, wherein the lower non-magnetic layer contains carbon black, a non-magnetic inorganic powder other than carbon black, and a binder resin;

the upper magnetic layer contains at least a ferromagnetic powder, a binder resin, and an abrasive having a Mohs hardness of 6 or above;

the back coat layer contains carbon black, a non-magnetic inorganic powder other than carbon black, and a binder resin; and the magnetic layer has a SENDUST abrasion volume $S_{MC}$ of $3.0 \times 10^4$ $(\mu m)^3/m$ or less and a ratio ($S_{BC}/S_{MC}$) of a SENDUST abrasion volume $S_{BC}$ by the back coat layer to the SENDUST abrasion volume $S_{MC}$ by the magnetic layer is in the range of 0.5 to 3.0.

2. The magnetic recording medium according to claim 1, wherein the SENDUST abrasion volume $S_{BC}$ by the back coat layer is in the range of $0.4 \times 10^4$ $(\mu m)^3/m$ or more and $4.0 \times 10^4$ $(\mu m)^3/m$ or less.

3. The magnetic recording medium according to claim 1, wherein a surface roughness Ra of the back coat layer is 20 nm or less.

4. The magnetic recording medium according to claim 1, wherein an AFM surface roughness Ra of the magnetic layer is in the range of 3.0 to 8.0 nm.

5. The magnetic recording medium according to claim 1, wherein the magnetic layer has a thickness of 0.3 $\mu m$ or less.

6. The magnetic recording medium according to claim 1, wherein a coefficient of kinetic friction of the back coat layer is in the range of 0.10 to 0.40.

7. The magnetic recording medium according to claim 1, wherein a centerline average roughness Ra of the surface of the magnetic layer is in the range of 1.0 to 8.0 nm.

* * * * *

UNITED STATES PATENT AND TRADEMARK OFFICE
CERTIFICATE OF CORRECTION

PATENT NO. : 7,011,900 B2
APPLICATION NO. : 10/806096
DATED : March 14, 2006
INVENTOR(S) : Akihiko Seki et al.

It is certified that error appears in the above-identified patent and that said Letters Patent is hereby corrected as shown below:

Column 1, line 21, "a-alumina" should read --$\alpha$-alumina--.
line 33, "an a phase ratio" should read --an $\alpha$ phase ratio--.

Column 6, line 23, "a-Fe$_2$O$_3$" should read --$\alpha$-Fe$_2$O$_3$--.
line 26, "a-Al$_2$O$_3$" should read --$\alpha$-Al$_2$O$_3$"--.

Column 10, line 39, "a-Fe$_2$O$_3$" should read --$\alpha$-Fe$_2$O$_3$--.
line 40, "a-Al$_2$O$_3$" should read --$\alpha$-Al$_2$O$_3$"--.

Column 11, line 60, "ss" should read --$\sigma$s--.
line 67, "ss" should read --$\sigma$s--.

Column 12, line 10, "a-FeOOH" should read --$\alpha$-FeOOH"--.
line 11, "a-FeOOH" should read --$\alpha$-FeOOH"--.
line 14, "a-FeOOH" should read --$\alpha$-FeOOH"--.
line 15, "a-FeOOH" should read --$\alpha$-FeOOH"--.
line 18, "a-FeOOH" should read --$\alpha$-FeOOH"--.
line 29, "a-FeOOH" should read --$\alpha$-FeOOH"--.
line 42, "a-FeOOH" should read --$\alpha$-FeOOH"--.
line 51, "a-FeOOH" should read --$\alpha$-FeOOH"--.
line 56, "a-FeOOH" should read --$\alpha$-FeOOH"--.
line 58, "a-FeOOH" should read --$\alpha$-FeOOH"--.
line 67, "a-FeOOH" should read --$\alpha$-FeOOH"--.

Column 13, line 2, "a-FeOOH" should read --$\alpha$-FeOOH"--.
line 5, "a-FeOOH" should read --$\alpha$-FeOOH"--.
line 9, "a-FeOOH" should read --$\alpha$-FeOOH"--.
line 23, "a-FeOOH" should read --$\alpha$-FeOOH"--.
line 30, "a-FeOOH" should read --$\alpha$-FeOOH"--.
line 31, "a-FeOOH" should read --$\alpha$-FeOOH"--.
line 34, "a-FeOOH" should read --$\alpha$-FeOOH"--.
line 35, "a-FeOOH" should read --$\alpha$-FeOOH"--.
line 62, "a-force" should read --$\alpha$-force"--.

Column 14, line 2, "atomosphere" should read --atmosphere--.
line 4, "a-Fe$_2$O$_3$" should read --$\alpha$-Fe$_2$O$_3$--.
line 4, "a-FeOOH" should read --$\alpha$-FeOOH"--.
line 8, "a-Fe$_2$O$_3$" should read --$\alpha$-Fe$_2$O$_3$--.

UNITED STATES PATENT AND TRADEMARK OFFICE
CERTIFICATE OF CORRECTION

PATENT NO. : 7,011,900 B2
APPLICATION NO. : 10/806096
DATED : March 14, 2006
INVENTOR(S) : Akihiko Seki et al.

It is certified that error appears in the above-identified patent and that said Letters Patent is hereby corrected as shown below:

Column 15, line 21, "a-alumina" should read --α-alumina--.

Column 18, line 30, "a-Fe magnetic powder" should read --α-Fe magnetic powder--.
           line 32, "ss" should read --σs--.
           line 34, "a-$Al_2O_3$" should read --α-$Al_2O_3$"--.
           line 36, "a-$Al_2O_3$" should read --α-$Al_2O_3$"--.

Column 19, line 44, "a-$Fe_2O_3$" should read --α-$Fe_2O_3$--.

Column 22, line 53, "a-$Al_2O_3$" should read --α-$Al_2O_3$"--.

Column 23, line 21, "a-$Al_2O_3$" should read --α-$Al_2O_3$"--.
           line 27, "a-$Fe_2O_3$" should read --α-$Fe_2O_3$--.
           line 28, "a-$Al_2O_3$" should read --α-$Al_2O_3$"--.
           line 37, "a-$Al_2O_3$" should read --α-$Al_2O_3$"--.
           line 49-50, "a-Fe magnetic powder" should read --α-Fe magnetic powder--.
           line 51, "ss" should read --σs--.
           line 53, "a-Fe magnetic powder" should read --α-Fe magnetic powder--.
           line 60, "a-$Al_2O_3$" should read --α-$Al_2O_3$"--.

Signed and Sealed this

Eighth Day of August, 2006

JON W. DUDAS
*Director of the United States Patent and Trademark Office*